No. 828,476. PATENTED AUG. 14, 1906.
J. F. HEISTER.
STOVE.
APPLICATION FILED JULY 14, 1904.
3 SHEETS—SHEET 1.
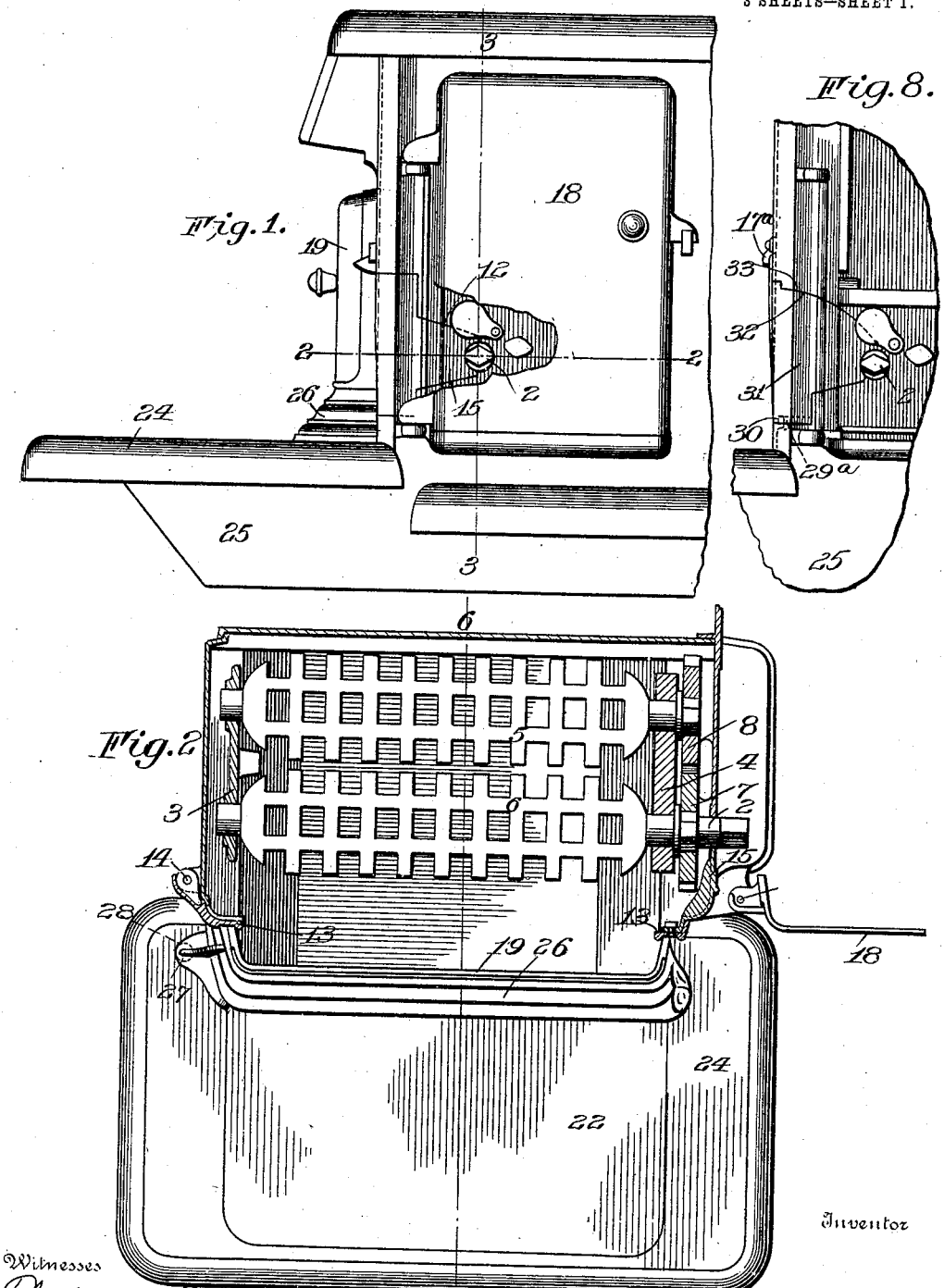
Witnesses
Walter B. Payne
Clarence A. Bateman
Inventor
John F. Heister
by Frederick H. Church
his Attorneys No. 828,476. PATENTED AUG. 14, 1906.
J. F. HEISTER.
STOVE.
APPLICATION FILED JULY 14, 1904.
3 SHEETS—SHEET 2.
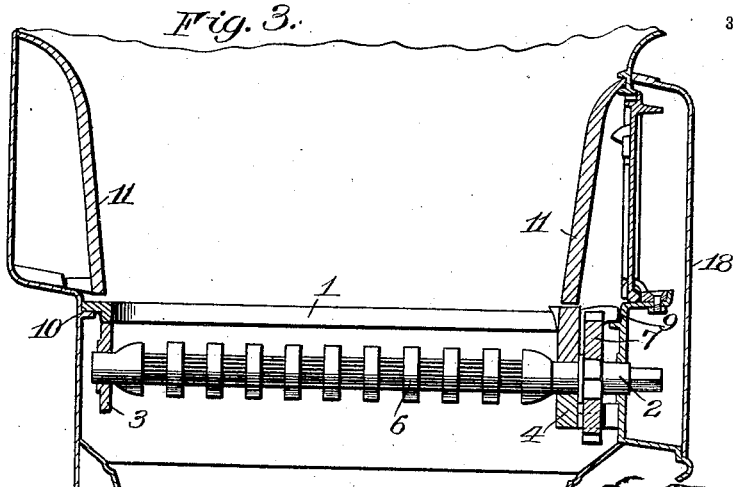
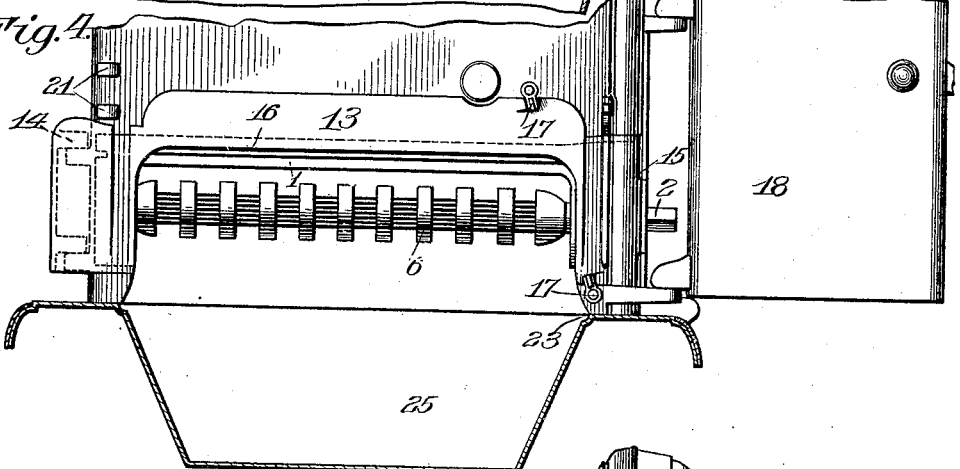
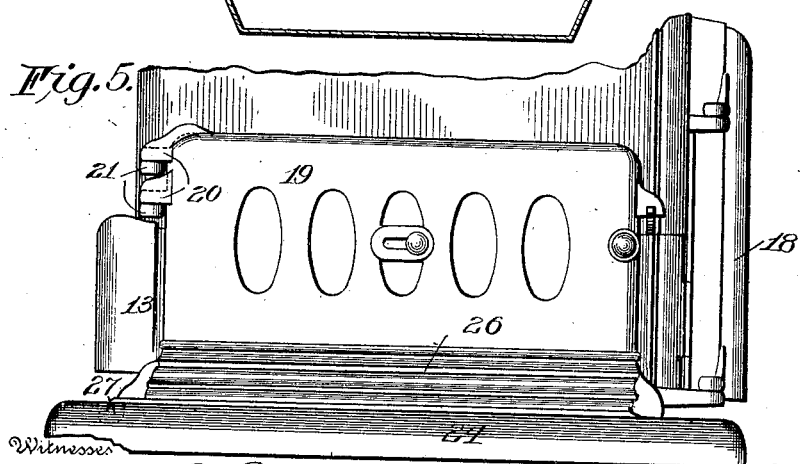

No. 828,476. PATENTED AUG. 14, 1906.
J. F. HEISTER.
STOVE.
APPLICATION FILED JULY 14, 1904.
3 SHEETS—SHEET 3.
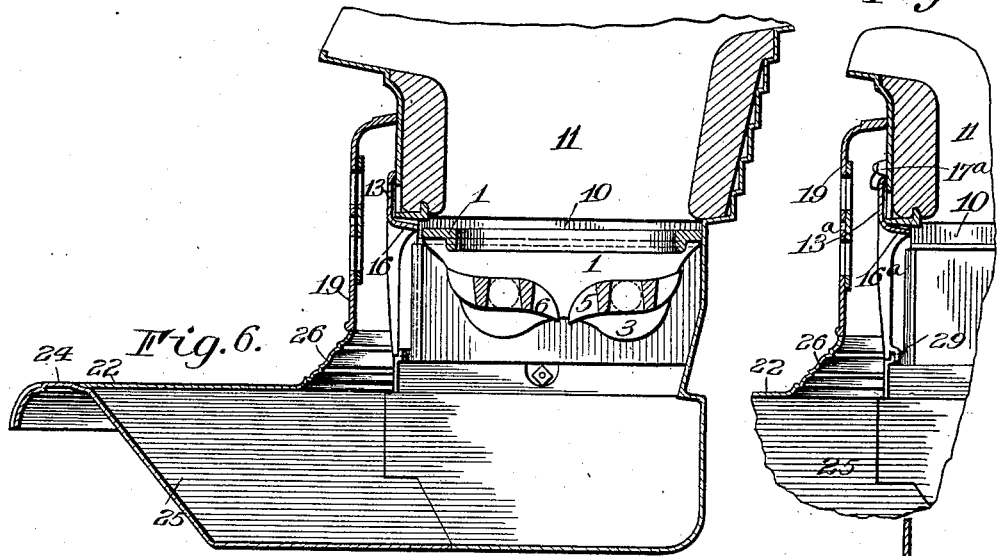
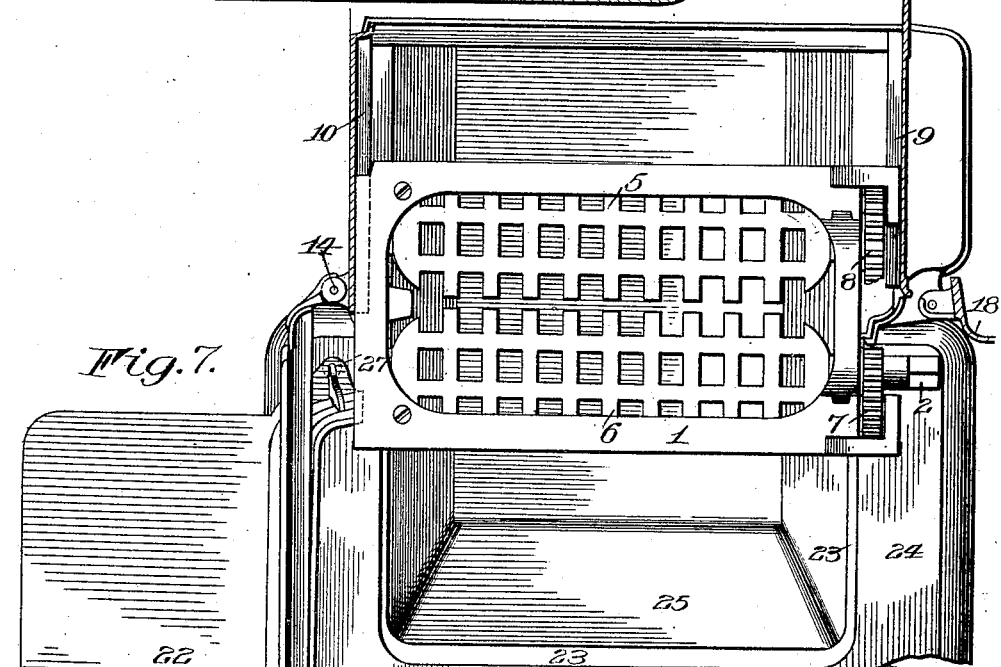

UNITED STATES PATENT OFFICE.

JOHN F. HEISTER, OF GENEVA, NEW YORK, ASSIGNOR TO PHILLIPS & CLARK STOVE COMPANY, OF GENEVA, NEW YORK, A CORPORATION OF NEW YORK.

STOVE.

No. 828,476.　　　　Specification of Letters Patent.　　　　Patented Aug. 14, 1906.

Application filed July 14, 1904. Serial No. 216,472.

*To all whom it may concern:*

Be it known that I, JOHN F. HEISTER, of Geneva, in the county of Ontario and State of New York, have invented certain new and useful Improvements in Stoves; and I do hereby declare the following to be a full, clear, and exact description of the same, reference being had to the accompanying drawings, forming a part of this specification, and to the reference-numerals marked thereon.

My present invention relates to improvements in stoves; and it has for its object to provide a device of this character wherein the grate and its supporting-frame may be bodily withdrawn laterally from beneath the fire-pot of the stove and out upon the hearth thereof for the purposes of inspection or renewal and which when in operative position within the stove is held therein by a retaining device that may be easily swung into position and locked to effectually retain the grate in its normal position beneath the fire-pot.

To these and other ends my invention consists in certain features of construction and arrangement to be hereinafter more fully explained, and pointed out in the claims hereunto annexed.

In the drawings, Figure 1 is a fragmentary view of a stove embodying my said invention, parts being broken away for clearness. Fig. 2 is a sectional view thereof in the line 2 2, Fig. 1. Fig. 3 is a vertical section on the line 3 3, Fig. 1. Fig. 4 is a side view of the stove with the ash-pan in section, showing the outer door removed to expose the grate-retaining device. Fig. 5 is a similar view showing the outer door in its closed position. Fig. 6 is a vertical sectional view on the line 6 6, Fig. 2. Fig. 7 is a horizontal sectional view similar to Fig. 2, showing the side and front doors and the grate-retaining device in open position and the grate partially withdrawn from the stove; and Figs. 8 and 9 are fragmentary views showing a modified form of retaining device.

The same numerals of reference designate corresponding parts in the several views.

In order that a clear understanding may be had of my said invention, reference will be had particularly to that form thereof illustrated in Figs. 1 to 7, inclusive, of the drawings, wherein 1 designates the grate-frame, which for the present purposes is preferably substantially rectangular, and at each end of this frame are provided the hangers 3 4, in which are journaled the revoluble grate-bars 5 and 6, an extension 2 being preferably formed upon the journal of one of these grate-bars and provided with a gear-wheel 7, meshing with the wheel 8 upon the journal of the opposite grate-bar to enable said bars to be conveniently and simultaneously rotated by the application of a crank or other suitable implement at the exterior of the stove. This grate-frame is supported in the present instance by a pair of horizontally-arranged supports or ways 9 and 10, which are formed in the chamber immediately beneath the fire-pot 11 and preferably in the front and rear walls thereof and so arranged that the overhanging ledge of the grate-frame 1 will rest thereon in such manner as to support the grate in its proper position beneath the fire-pot 11. A portion of the stove in front of the grate is cut away, as at 12, to form a recess or passage through which the extension of the journal 2 may pass during the withdrawal of the grate, and at the side of the grate an aperture of sufficient dimensions to permit the ready removal of the grate is formed.

When the grate is in its proper position beneath the fire-box, it is retained therein by a retaining device embodying in the present instance a swinging arm 13, hinged at one end by the hinge 14 to the stove at one side of the side opening and carrying at its opposite end the extension 15, forming a closure for the recess 12 and having a portion adapted to engage the operating extension 2 of the grate-bar to prevent lateral displacement. A laterally-projecting rib 16 is preferably formed upon the inner side of this arm, which will engage the lateral edge of the grate-frame 1 to firmly retain it in position, suitable fastening devices 17 17 being preferably employed for locking the grate-retaining arm 13 in its closed position. In practice I prefer to locate the hinge 14 at a point directly in rear of the recess 12 in the front of the stove, so that the retaining-arm 13 in swinging open will require a minimum amount of clearance, such an arrangement permitting the front door 18 to be hinged comparatively close to the stove-body and still clear the lateral projection 15 upon the free end of the retaining device.

The lower portion of the retaining-arm 13 is preferably cut away for the purpose of exposing the under side of the grate and rendering the ash-pit beneath it accessible, and it is also preferable to fit this retaining-arm into the side of the stove in such a manner as to present a flush surface against which the draft-door 19 may snugly fit, the hinge-pins 20 20 upon this door coöperating with the hinge-lugs 21 21, which are located in the present instance on the stove at the side of the draft-opening and above the swinging arm 13, so as to clear the latter in its motion. Beneath this draft-door is hinged the hearth-plate 22, which is adapted to fit within a correspondingly-shaped seat 23, formed in the upper surface of the hearth 24, said plate forming a closure or cover for the overhanging portion of the ash-pit 25, a flange 26 being preferably provided upon the hearth-plate that is adapted to move into position beneath the draft-door 19 to close the aperture beneath it. This hearth-plate is hinged to the overhanging hearth 24 by the hooked projection 27, resting in an aperture 28 in the hearth to one side of the ash-pit 25, the hearth-plate being first slightly elevated to free itself from the depressed seat 23 and then swung around this hinge connection as a pivot.

In order to withdraw the grate from its normal position within the stove for the purposes of inspection or repair, the draft-door 19 is removed from its hinges, and the hearth-plate 22 is swung into its open position, thereby enabling the fastening device 17 to be manipulated to release the grate-retaining arm 13, permitting it to be swung on its hinges 14 to withdraw the lateral extension 15 from the recesss 12 in the front of the stove to allow the passage of the operating extension of the grate and also disengaging the laterally-projecting rib 16 from the lateral edge of the grate-frame. When this has been accomplished, the grate may be freely withdrawn from the stove through the aperture thus uncovered, the overhanging ends of the grate-frame sliding upon the ways 9 and 10 in the front and rear walls, respectively, of the grate-chamber.

Should it be found desirable to employ a simpler form of grate-retainer, one similar to that shown in Figs. 8 and 9 may be employed, in which case the retaining device 13ª is provided with a pair of depending lugs 29 29ª, the lower ends of which are forked or bifurcated to engage upon each side of the portion 30 of the stove, the upper portion of the retaining device being provided with a laterally-projecting rib 16ª, that will engage the lateral edge of the grate-frame when it is in its normal locked position, locking devices 17ª being employed for retaining it in such a position. The forward end of this retaining device is provided with an extension 31, the upper edge 32 of which is preferably formed on the arc of a circle having its center in proximity to the parts 30 of the stove, about which parts the retaining device swings in being removed. As this extension 31 is adapted to enter a correspondingly-shaped recess 33 in the front wall of the stove to close the passage provided for the extension 2 of the grate-bar it will be seen that when the fastening devices 17ª are properly manipulated to release the retaining device it may be tilted forwardly, resting on the part 30 as a center, causing the projecting rib 16ª to disengage from the side edge of the grate-frame and causing the extension 31 to be withdrawn from the correspondingly-shaped recess of the stove, thereby permitting the grate to be freely withdrawn.

A draw-out grate embodying my invention is very simple and inexpensive in construction, and in operation it provides an extremely convenient means by which the grate may be readily withdrawn from the stove for the purposes of inspection or repair. Moreover, it will be obvious that as the grate is withdrawn laterally, so that it will rest above the hearth at the side of the stove, ashes and cinders dropping from the grate will be received in the ash-pit, thereby avoiding those annoyances that are experienced with draw-out grates as heretofore constructed. It will also be obvious that a grate-retaining device embodying my invention may be readily and easily unlocked and locked in position without liability of becoming lost or broken, and when in its locked position it will effectually retain the grate in its proper position without obstructing the draft or interfering with the functions and operation of other portions of the stove.

I claim as my invention—

1. In a stove, the combination with the casing having a fire-pot therein, and grate-supports arranged beneath the fire-pot, of a grate mounted to operate on said supports, and an arm pivoted to swing into a position transverse to the direction of movement of the grate and adapted to engage the latter to retain it in operative position beneath the fire-pot.

2. In a stove, the combination with the casing having a recess therein, a hearth formed in the casing beneath the fire-pot and extending to one side of the latter, and ways arranged beneath the fire-pot, of a grate mounted to operate longitudinally on said ways and having an operating extension arranged to enter the recess of the casing when the grate is moved into operative position beneath the fire-pot, and a retaining device pivoted to swing transversely of said ways and having an extended portion arranged to enter the recess of the casing and coöperate with the operating extension of the grate to retain the latter in operating position beneath the fire-pot.

3. In a stove, the combination with the casing, a fire-pot therein, and grate-supports formed in the casing below the fire-pot, the casing being provided with a recess, of a grate slidably mounted on said supports and having an operating extension arranged to enter the recess of the casing as said grate moves into position therein beneath the fire-pot, and a retaining·device pivotally supported on the stove-casing and having a portion adapted to register with said recess and coöperate with the extension of the grate to retain the latter in operative position within the casing.

4. In a stove, the combination with the stove-casing having an aperture at one side, and also having a recess formed in an adjacent side thereof and extending inwardly from the aperture, a fire-pot formed in the stove-casing, and ways arranged beneath the fire-pot and leading to said aperture, of a grate mounted on said ways and having a movable grate member provided with an operating extension resting in said recess of the casing, and a grate-retaining device having a hinge connection with the casing and carrying a portion arranged to enter said aperture and engage a part of the grate and a portion adapted to enter said recess in the casing and engage the operating extension of the grate resting therein.

5. In a stove, the combination with a casing having a draft-aperture at one side and also having a recess extending from said aperture into an adjacent side thereof, a fire-pot formed in the casing, and ways arranged below the fire-pot and leading to said draft-opening, of a grate movably supported on said ways and adapted to be withdrawn laterally through said draft-aperture, said grate having a movable portion provided with an operating extension adapted to project through said recess in the casing while the grate is being withdrawn, and a retaining device having a hinge bearing on the stove-casing and provided with a portion engaging the lateral edge of the grate and having also a portion resting in said recess of the casing and engaging the operating extension of the grate.

6. In a stove, the combination with a casing having a draft-aperture therein, and having also a recess extending inwardly from said aperture into an adjacent side of the casing, a fire-pot formed in the casing, and a grate removably mounted in the casing having a movable grate member, the latter provided with an operating extension resting in said recess of the casing, of a retaining device hinged to the casing at a point opposite to the recess thereof, and having a portion arranged to enter said aperture and coöperate with the grate, and an additional portion adapted to enter the recess of the casing and engage the operating extension of the grate to retain the latter in operative position beneath the fire-pot.

7. In a stove, the combination with the stove-casing having a draft-aperture therein, and having also a recess extending into a part of the casing from said draft-aperture, and a fire-pot formed in the casing, of a grate normally resting beneath said fire-pot and adapted to be withdrawn through said aperture; said grate having a movable portion provided with an operating extension arranged to rest in the recess of the casing, a grate-retaining arm arranged to swing across a portion of said draft-aperture and having a part coöperating with the side of the grate and also having a portion arranged to rest in the recess of the casing and coöperate with the extension of the grate to retain the latter in operative position beneath the fire-pot, and a door operable independently of said grate-retaining arm for covering and uncovering the draft-aperture.

JOHN F. HEISTER.

In presence of—
 GEO. F. ANNAS,
 HERBERT M. MILLER.